United States Patent [19]

Brenner et al.

[11] 4,288,063
[45] Sep. 8, 1981

[54] RUBBER ELASTIC ENGINE MOUNTS OR SUPPORTS WITH HYDRAULIC DAMPING, ESPECIALLY FOR ENGINE SUSPENSIONS IN MOTOR VEHICLES

[75] Inventors: Heinz Brenner; Arno Hamaekers, both of Ahrweiler, Fed. Rep. of Germany

[73] Assignee: Boge GmbH, Eitorf, Fed. Rep. of Germany

[21] Appl. No.: 35,512

[22] Filed: May 3, 1979

Related U.S. Application Data

[60] Division of Ser. No. 889,381, Mar. 23, 1978, Pat. No. 4,215,842, which is a continuation-in-part of Ser. No. 791,309, Apr. 27, 1977, Pat. No. 4,161,304.

[30] Foreign Application Priority Data

Mar. 23, 1977 [DE] Fed. Rep. of Germany ....... 2718121
Mar. 24, 1977 [DE] Fed. Rep. of Germany ....... 2713008

[51] Int. Cl.³ .............................................. F16F 1/36
[52] U.S. Cl. .................................. 267/8 R; 248/562; 248/635; 267/140.1; 267/153
[58] Field of Search .................. 267/141, 141.2, 141.1, 267/141.3, 141.4, 141.5, 141.6, 141.7, 35, 8 R, 152, 153, 140.1; 280/621, 216; 248/562, 615, 634, 635, 637, 638; 188/298

[56] References Cited

U.S. PATENT DOCUMENTS

| | | | |
|---|---|---|---|
| 1,992,555 | 2/1935 | Templin | 188/298 X |
| 2,437,206 | 3/1948 | Neher | 267/140.3 |
| 2,540,130 | 2/1951 | Lee | 248/562 X |
| 2,562,195 | 7/1951 | Lee | 267/140.1 |
| 2,582,998 | 1/1952 | Lee | 267/140.1 |
| 2,888,106 | 5/1959 | Peros | 188/298 |
| 3,266,139 | 8/1966 | Adams | 267/141.4 X |
| 3,494,607 | 2/1970 | Rusch | 267/152 X |

FOREIGN PATENT DOCUMENTS

| | | | |
|---|---|---|---|
| 255872 | 2/1927 | United Kingdom | 188/98 |
| 971970 | 10/1964 | United Kingdom | 267/8 R |

*Primary Examiner*—George E. A. Halvosa
*Attorney, Agent, or Firm*—William R. Hinds

[57] ABSTRACT

Elastic rubber engine mounts with hydraulic damping are provided, especially for engine suspensions in motor vehicles. The mounts comprise two separated liquid-filled chambers, defined in part by elastic rubber-like peripheral walls adheringly connected with end walls and with a centrally disposed supporting element for connection to an engine supporting frame. The liquid chambers are separated by an elastic rubber-like partition connected with the supporting element, and flow connection between the two chambers is provided by perforations or choke openings in the partition. The rigid end walls of the two chambers are rigidly interconnected. Arrangements are provided for minimizing or avoiding hydraulic damping of oscillations of low amplitude and high frequency, while providing hydraulic damping for oscillations of large amplitude and low frequency. This is achieved by limited compensation of volume changes in the chambers, through either axially reciprocable annular members disposed in the partition and axially movable relative to the support element, or by flexible wall parts in the rigid end walls. The flexible wall parts may be in the form of diaphragms, and the diaphragms may advantageously be of foamed material. Hydraulic damping thus occurs only upon oscillations of predetermined amplitude and frequency.

10 Claims, 5 Drawing Figures

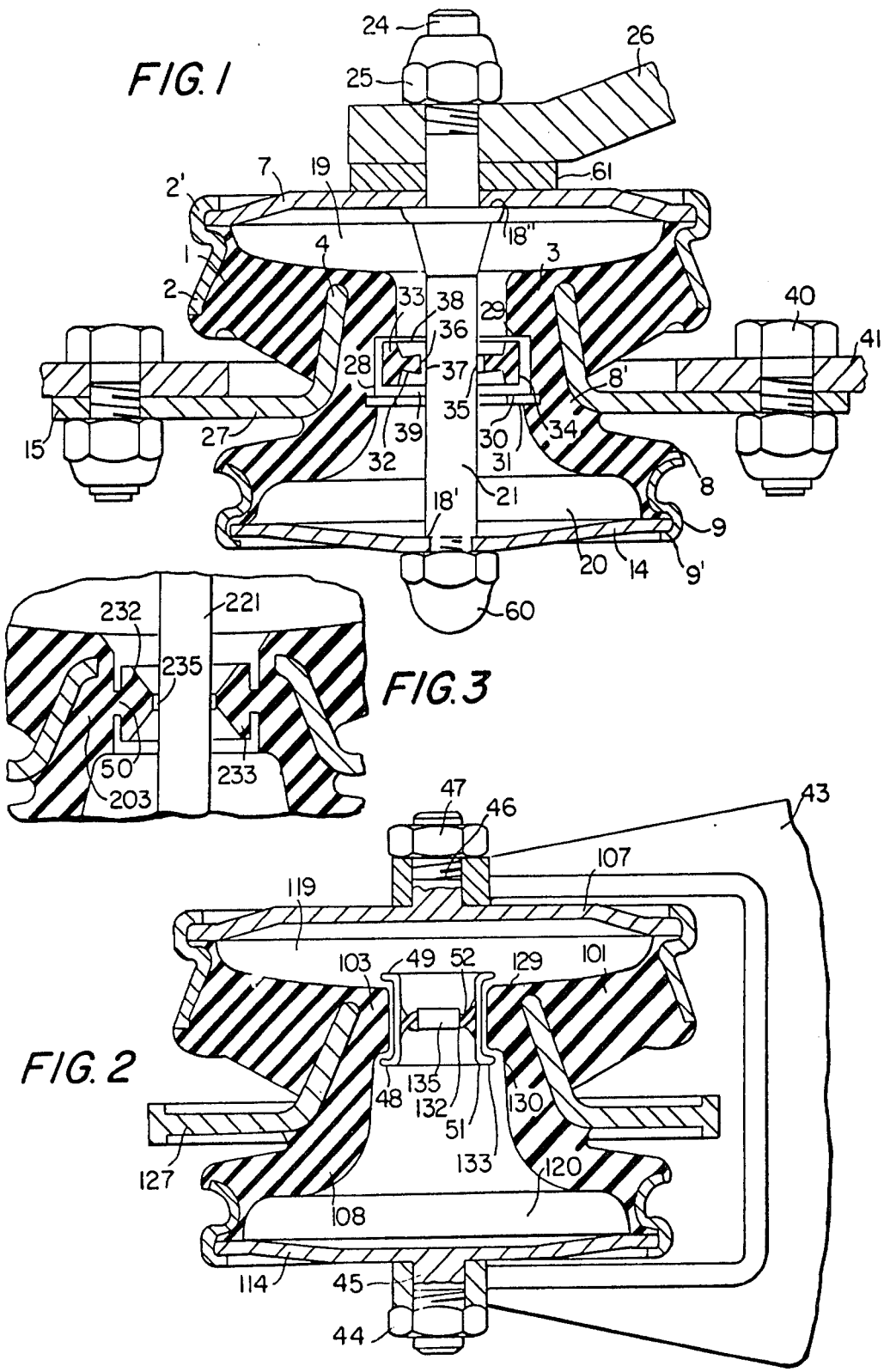

RUBBER ELASTIC ENGINE MOUNTS OR SUPPORTS WITH HYDRAULIC DAMPING, ESPECIALLY FOR ENGINE SUSPENSIONS IN MOTOR VEHICLES

This application is a division of Application Ser. No. 889,381, filed Mar. 23, 1978, now U.S. Pat. No. 4,215,842, issued Aug. 5, 1980, which was a continuation-in-part of U.S. Application Ser. No. 791,309, filed Apr. 27, 1977, now U.S. Pat. No. 4,161,304, issued July 17, 1979.

FIELD OF THE INVENTION

This invention relates to liquid-filled rubber or elastic engine mounts or bearings with hydraulic damping, especially for supporting or mounting engines in motor vehicles so as to vibrationally insulate the vehicle frame from the engine. More particularly, this invention relates to such engine mounts of the type disclosed in our copending application Ser. No. 791,309, filed Apr. 27, 1977, the disclosure of which is incorporated herein by reference. The engine mounts disclosed and claimed in the instant application present improvements and/or variations of the mounts disclosed in our said parent application.

BACKGROUND AND SUMMARY OF THE INVENTION

The invention of this application is directed to the problem of providing such an engine mount with simple means which meet the requirement that oscillations of the engine casing be hydraulically damped by the engine mount when such oscillations are of low frequency and relatively great amplitude, and that high frequency oscillations with relatively small amplitudes of, for example, 0.1 mm remain hydraulically undamped as far as possible, whereby the vehicle frame or related engine supporting elements will not be loaded with hydraulic damping stresses.

Engine mounts of the type to which the instant invention relates generally comprise a first metallic end wall for connection to an engine casing, a second metallic end wall spaced axially from the first wall, a metallic supporting element for connection to an engine supporting frame, a first elastic rubber-like peripheral wall adheringly connected with the first end wall and with the supporting element, a partition connected with the supporting element so as to define with the first end wall and the first peripheral wall a liquid-filled main chamber of variable volume on one side of the partition, a second elastic rubber-like peripheral wall adheringly connected with the second end wall and with the supporting element so as to define an auxillary liquid-filled chamber of variable volume on the other side of the partition, means such as perforations or choke openings defining a flow connection between the main and auxiliary chambers, and means rigidly connecting the first and second end walls together for joint movement relative to the supporting element.

In one approach taken by the instant invention, there is disposed in the partition an annular member forming choke openings or connections between the main chamber and the auxiliary chamber, the annular member being disposed so as to be axially movable with reference to the partition and being limited in its stroke in the middle of the partition. Preferably the stroke of the annular member through the middle of the partition is such that the stroke volume of the annular member (the axially facing surface area of the annular member multiplied by the stroke distance) corresponds to the displacement volume of the liquid filled chambers with a total oscillation path of the engine mount of up to 0.2 to 0.3 mm. In this way, the engine oscillations up to this range cause substantially no liquid exchange between the chambers, but rather only a shifting or stroke of the annular member, whereby advantageously only a very small shifting force results, acting indirectly via the rubber-elastic peripheral walls on the metallic supporting element, because the mass of the annular member can be very small. With increasing oscillation paths, there is a gradual exchange of liquid between the main chamber and the auxiliary chamber that exerts damping forces, until with oscillation paths of, for example, 5 mm or more, strong damping forces are established by the flow resistance of the choke openings.

Advantageously a plate-like annular member is surrounded by an inwardly opening groove in the partition, whereby the groove flanks form impact surfaces, or alternatively the annular member is provided with U-shaped outwardly directed flanges that extend to impact surfaces on the partition. Here the impact surfaces of the partition and of the annular member may simply constitute tight contact surfaces in a stroke-limited state. If the annular member in non-stroke-limit positions presents free annular gaps with respect to the partition, the annular member can oscillate undamped between the impact surfaces of the annular member and the partition, and also the possible exchange of volume between the chambers can additionally suppress or ameliorate the occurrence of hydraulic damping forces at small amplitudes. The choke openings can be provided directly in a plate-like annular member, or in an intermediate wall of the annular member. Advantageously the annular member has only one choke opening which determines flow resistance with its full cross-section, or forms an annular cross-section that determines flow resistance with a bolt that connects the end walls. The intermediate wall of the annular member that is provided with a choke opening, or the whole annular member, can be made of a rubber-elastic material, whereby the choke opening may present a lip-like edge with a flow profile of special configuration turned toward the opening, which edge portion can be deformed by the flow forces to effect an enlargement or a reduction of the flow cross-section and a change of the throughput coefficient. Thus the flow resistance of the choke opening can be influenced or varied as desired, with increasing liquid exchange between the two chambers.

The annular member can be joined to the partition by a thin elastic flange, whereby also the deformation strength of the flange can limit the stroke of the annular member.

If an annular member penetrated by a connecting bolt presents a free annular gap and/or at least a resilient lip of elastic material in the region of the choke opening, there is achieved the advantage of ready transverse mobility of the walls that are rigidly joined by the connecting bolt, with reference to a partition that has little resilience.

In another aspect of the instant invention, the previously mentioned problem is solved by providing in one or both end walls openings or perforations that are covered by resilient wall parts which pose a decreasing resistance to a change of the fluid pressure in the appurtenant chamber, that is, the main chamber or the auxiliary chamber. Otherwise stated, these resilient wall parts are initially flexible so as to compensate for any volume change in the chamber, and hence resist a change of fluid pressure in the chamber, but thereafter the resilient wall parts reach the limit of their resilience so as not to compensate further or to the same degree to volume changes of the chamber, such that the fluid pressure in the chamber will rise rapidly. Thus the volume changes in the chambers per unit of time, at low amplitudes and high frequencies, are compensated by a corresponding movement of the resilient wall face parts without the need for any liquid exchange worth mentioning to occur through the choke opening, whereas at large amplitudes and low frequencies the volume changes or liquid volumes forced per unit of time, which volumes may be of the same total magnitude, will only in small part be taken up by the resilient wall parts, and the essential portion of the liquid must flow exclusively through the choke opening as soon as the resilient wall parts have respectively reached a limit of their yielding.

By the measures provided by this aspect of the invention, advantageously at small amplitudes and high frequencies the pressure building up in the chambers can be kept low by an appropriate dimensioning and configuration of the resilient end wall parts, and hydraulic damping will therefore be slight or insignificant, whereas at large amplitudes with low frequencies the pressure that is building up can be kept relatively high by suitable dimensioning and configuration of the choke opening, and hence hydraulic damping to the required degree will be attained.

In the inoperative state of an engine mount in accordance with the second aspect that is ready for operation, the chambers advantageously are at a pressure that is at or only slightly above or below atmospheric pressure. Then, if one considers approach of the end wall on the engine side to the supporting element to be the compression stage, and retreat of the said end wall from the supporting element to be the suction stage, with large volumes, evoked by large amplitudes in the compression stage only in the main chamber and in the auxiliary chamber only in the suction stage, pressure differences will occur that are determined by the actual flow resistance of the choke opening, the differences moving the resilient wall parts outwardly, while the auxiliary chamber in the compression stage and the main chamber in the suction stage will retain essentially the initial pressure. Consequently in both chambers there will only be slight pressure differences that tend to move the resilient wall parts inwardly.

Advantageously the resilient wall parts are made as diaphragms that are tightly joined with the edges of the openings or perforations in the end walls. The resilient wall parts can be made especially simply if a perforated wall face and rubber elastic diaphragms are adheringly joined at the edges of the perforations, forming a vulcanized rubber metallic part. The diaphragms can be made so that they are substantially flat in the dynamic middle portion of an operational engine mount. As soon as a diaphragm of suitable dimensions and configuration is bulged more strongly outwardly or inwardly from the basic position, the deformation strength or resistance thereof increases progressively, and, with large amplitudes, it can build up the desired pressure in the chambers. If the deformation strength of a diaphragm or other resilient wall part is inadequate for this purpose, simple mechanical ancillary means can reenforce the resistance of the resilient wall part with respect to the occurring pressure difference, e.g., a plate connected with the end wall can constitute an impact surface which limits the give of the diaphragm or similar part, after a predetermined stroke. The resilient wall parts may also be made as diaphragm parts applied to the inner side of a perforated wall face, whereby advantageously a diaphragm that covers the whole inside may lie freely on the wall face or be adheringly joined thereto. Material for diaphragms of this kind may also be a foamed material, especially polyurethane, made up of individual bubbles, whereby the resilience of the diaphragm with reference to the perforations or openings and the intrinsic resilience of the foamed material are summed, and acting together in case of high frequency oscillations and low amplitudes they compensate the volumes forced in the chambers, or the volume changes of the chambers. If such a foamed diaphragm is provided on the liquid side with a thin metallic or plastic foil, gas or liquid exchange between the individual bubbles and the appurtenant chamber can be reliably avoided, and it can even be prevented that a diaphragm without a foil will be punched through the perforations if the pressure in the chamber becomes increasingly high.

In general it is advantageous to equip both end walls of the engine mount with resilient wall parts in order to be able to compensate forced volume changes at low amplitudes and high frequency oscillation. If the elastic peripheral wall on the engine side essentially determines the elastic bearing capacity of the engine mount, and the peripheral wall away from the engine is so resilient that by corresponding deformation it can compensate the forced volumes in case of small amplitudes and high frequencies, it suffices to provide resilient wall parts only for the end wall toward the engine. There may be other reasons also for equipping only one end wall with resilient wall parts according to the invention, particularly if other supplementary measures of some other kind are provided for the engine mount to suppress hydraulic damping with high frequency oscillations and low amplitudes. It should be observed that quite generally other measures which are frequency or amplitude dependent may be combined with the invention to reenforce the effect described here, to influence the damping in the desired way, for other characteristic frequency/amplitude ranges, e.g., to reenforce them or to reduce them.

Other features, advantages and aspects of the invention will become apparent to those skilled in the art from the ensuing description of preferred embodiments, taken in conjunction with the accompanying drawings.

BRIEF DESCRIPTION OF THE DRAWINGS

FIG. 1 shows in sectional elevation an engine mount in keeping with the first discussed aspect of the invention, in a static setting with a plate-like annular member penetrated by a connecting bolt.

FIG. 2 shows an engine mount similar to FIG. 1, but with a different kind of annular member, having faces rigidly connected by an arcuate member.

FIG. 3 is a cut-away view of a mount similar to FIG. 1, having a rubber elastic annular member connected with the partition.

Referring to FIG. 1 elastic peripheral wall 1 on the engine side is adheringly joined at its outer periphery with a metallic jacket 2, and at its inner periphery with a conical jacket 4. Jacket 2 is fixed by means of a flange 2' to an end wall 7 on the engine side. Conical jacket 4 and a flange 15 that is integral therewith form a supporting element or backup 27 which is bolted by bolts 40 on an engine support frame 41 of a vehicle chassis that is not otherwise illustrated. A rubber elastic peripheral wall 8 on the side away from the engine is adheringly joined at its outer periphery in the region of its major diameter with a metallic jacket 9, and at its outer periphery in a tapered region 8' of smaller diameter with the supporting element 27. Jacket 9 is fixed by a flange 9' to an end wall 14 turned away from the engine. A connecting bolt 21, which has a shoulder 18' turned away from the engine and a shoulder 18" on the side toward the engine, is connected by nut 60 with wall 14, and by a plate 61 with wall 7, and thus connects the two end walls 14 and 7 rigidly with each other. Wall 7 is fixed by means of a threaded extension 24 of bolt 21, and a nut 25, to engine housing or casing 26. A rubber elastic partition 3 is adheringly joined at its outer periphery with conical jacket 4 of supporting element 27, and is made integrally with peripheral wall 8.

Figure 4:
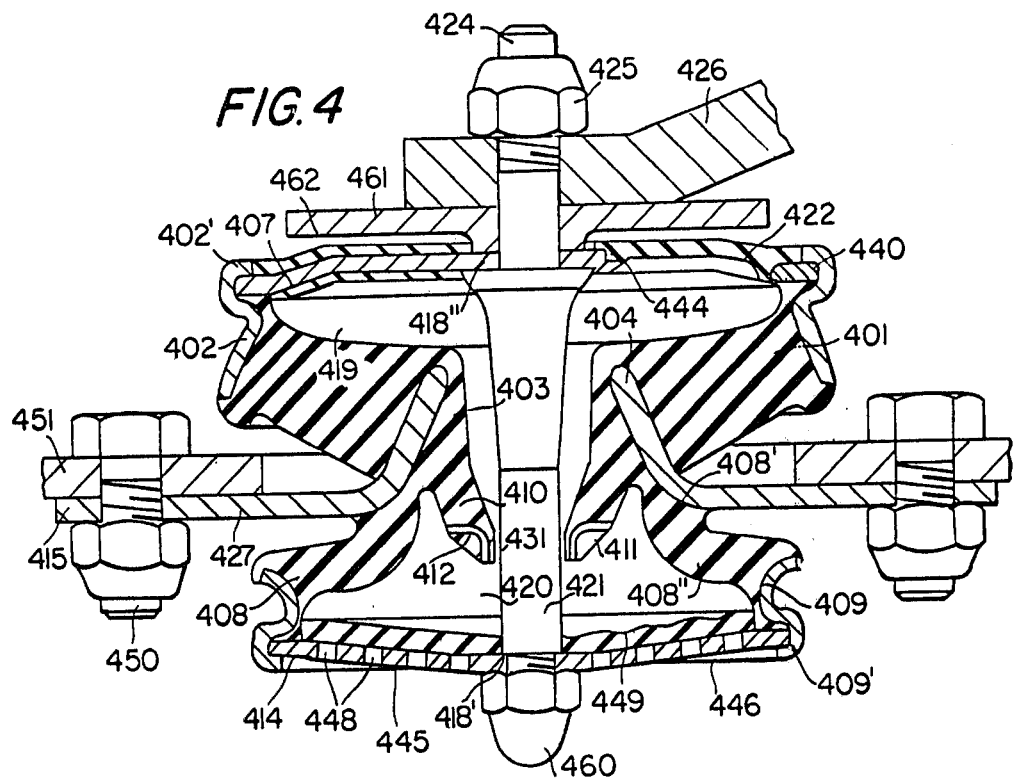
FIG. 4 shows an engine mount in accordance with the second discussed aspect of the invention, in section, with an end wall on the engine side that presents four elastic diaphragms adheringly joined to the edges of four perforations or openings, and an end wall turned away from the engine, on the inside of which there is a diaphragm of foamed material.

Partition 3 has an inwardly opening groove 28 which presents a rubber elastic groove flank 29 on the engine side and a flank 30 facing away from the engine, flank 30 being formed by a plate 31 rigidly anchored in the partition. Groove 28 encloses a rubber elastic annular member 33 which is penetrated by connecting bolt 21 and provided with a partition 32. This member 33 is movable in all directions in the illustrated position, and its axial stroke is limited by groove flanks 29 and 30 which act as impact surfaces. With the radially outer surface of groove 28, annular member 33 forms a free annular gap 34. Partition 32 with connecting bolt 21 forms an annular choke opening 35, and in the region of choke opening 35 it presents a lip-shaped edge 36 with arcuate profile, whose crest 37 is in the middle of choke opening 35. Edge 36, when annular member 33 is held fixed, is relatively easily deformed transversely by connecting bolt 21 when contact is made between these members.

A main chamber 19 is limited by peripheral wall 1 and end wall 7, and divided off by partition 3 and annular member 33 from an auxiliary chamber 20 that is defined by peripheral wall 8 and end wall 14. Main chamber 19 and auxiliary chamber 20 are filled with a hydraulic fluid, and are connected via choke opening 35. In the illustrated position of annular member 33, there is another connection of chambers 19 and 20 along a flow path via a gap 38 formed by annular member 33 and groove flank 29, annular gap 34, and gap 39 formed by annular member 33 and groove flank 30.

The axially facing displacement surface of annular member 33 (e.g. the upper surface as viewed in FIG. 1) multiplied by the summed gap width of gap 38 an 39 determines a maximum stroke volume (stroke displacement volume) of annular member 33. With very small oscillation amplitudes of end walls 7 and 14 with reference axially to support element 27, where the volume which tends to move between chambers 19 and 20 does not exceed the stroke volume of annular member 33, this member 33 can oscillate back and forth between groove flanks 29 and 30, whereby substantially no liquid exchange occurs between chambers 19 and 20, and hence no hydraulic damping of the oscillations of the engine mount occurs. With oscillations of greater amplitude, with liquid volume tending to move between the chambers that exceeds the stroke volume of annular member 33, there is an exchange of liquid between chambers 19 and 20 through choke opening 35, according to the momentary flow-conditioned application of annular member 33 on flank 29 or on flank 30. The throughput quantity at choke opening 35 is so much the greater, the greater the oscillation path remaining after application of annular member 33 to flank 29 or 30, and between chambers 19 and 20 there will be a pressure differential caused by the flow resistance of choke opening 35, whereby the throughput velocity with a given throughput quantity will depend upon the flow through the cross-section of choke opening 35, and the flow coefficient of choke opening 35 is determined by the profile of edge 36.

In the illustrated position of partition 32, edge 36 causes a nozzle-like intake flow and a nozzle-like discharge flow. When partition 32 is bent as a result of a correspondingly great pressure difference between chambers 19 and 20, the flow cross-section as well as the flow coefficient of choke opening 35 will change, since the intake flow will not remain nozzle-like, but will have an acute angle. This causes a pronounced rise in the flow resistance of choke opening 35 with reference to an unvariable profile of edge 36. With a suitable configuration of edge 36, it can likewise be arranged to have the flow resistance rise less, particularly if with increased bending of a soft partition 32 the flow cross-section of choke opening 35 can be made much larger. The flow behavior of the illustrated device can be affected by a supplementary control function of annular member 33, e.g. by providing perforations in plate 31 which remain open when annular member 33 is applied to groove flank 30, and which have no effect if annular member 33 is applied to groove flank 29. The flow resistance of the device thus can be made of different magnitudes, depending upon the direction of flow; in the mentioned case, it would be less with emptying of main chamber 19 into auxiliary chamber 20, than with filling from auxiliary chamber 20.

Referring now to FIG. 2, in the engine mount or bearing according to this figure a main chamber 119 is defined by a peripheral wall 101 that is adheringly joined to a backup or support element 127, and an end wall structure generally designated 107, and divided from an auxiliary chamber 120 by a partition 103 that is adheringly joined to support element 127, in conjunction with an annular member 133, the auxiliary chamber 120 being defined by a peripheral wall 108 and an end wall 114. Support element 127 can be conventionally connected with an engine supporting frame, as in the embodiment of FIG. 1. End walls 107 and 114 present outwardly projecting pins 46 and 45, respectively, and are connected by nuts 47 and 44 with a C-shaped supporting arm 43, such that the pins 46 and 45 can be slid laterally into the supporting arm 43. Supporting arm 43 connects end walls 107 and 114 rigidly with each other, and it can be connected in a conventional manner with the engine housing or a part of the engine housing.

Annular member 133, which comprises a metallic ring and a rubber elastic partition 132 adheringly connected therewith, has two outwardly directed U-shaped flanges 48 and 49 which extend over partition 103, with member 133 being movable to all sides with reference to partition 103. The axial stroke of annular member 133 is limited by faces 129 and 130 of partition 103. Partition 132 presents a choke opening 135, in which the edge 52 turned toward main chamber 119 is sharply angular, and the edge 51 turned toward auxiliary chamber 120 is rounded, so that choke opening 135 has different flow coefficients in the two directions of flow. The function of the engine mount, of course, corresponds to the previously described function of the engine mount of FIG. 1.

In accordance with the further embodiment illustrated in FIG. 3, a rubber elastic annular member 233 with a partition 232 is made as one piece with a partition 203, and is joined with partition 203 by a thin flange 50. Partition 232 constitutes a choke opening 235, together with a bolt 221 that penetrates annular member 233. Flange 50 offers only slight opposition to small axial movements of annular member 233, so that the function of annular member 233 with small movement is similar to that of annular member 33 of FIG. 1. With larger movements the deformation strength of flange 50 is substantial, and annular member 233 is to be considered to be stroke limited in the sense of the invention.

Figure 5:
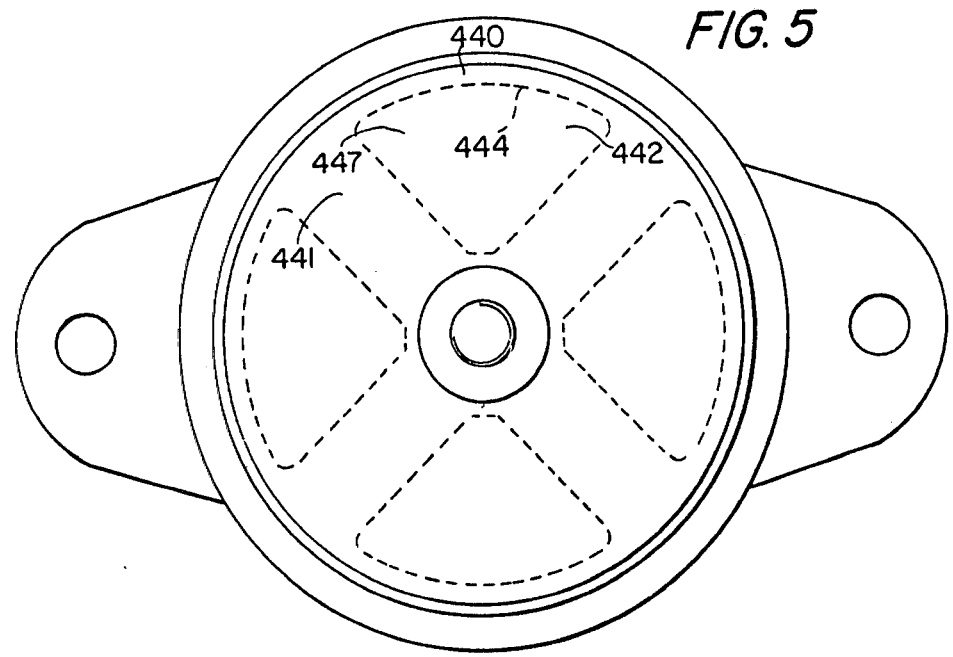
FIG. 5 is a plan view of the end wall of the mount of FIG. 4, the end wall being the upper end wall on the engine side as viewed in FIG. 4.

Referring now to FIGS. 4 and 5, which illustrate an embodiment in keeping with further aspects of the invention, a rubber elastic peripheral wall 401 on the engine side is adheringly joined at its outer periphery with a metallic jacket 402 and at its inner periphery to a conical jacket 404. Jacket 402 is fixed to wall face 407 on the engine side by means of a flange 402'. Conical jacket 404 and a flange 415 that is made as one piece therewith constitute a supporting element or backup 427 which is fastened by bolts 450 to an engine support frame 451 of a vehicle structure. A rubber elastic peripheral wall 408 on the side away from the engine is adheringly joined at its outer periphery in the region of its major diameter with a metallic jacket 409, and at its outer periphery in a tapered region 408' (which has a smaller diameter than that of jacket 409) with supporting element 427. Jacket 409 is fixed by a flange 409' to end wall 414 relatively away from the engine. A connecting bolt 421 which has a shoulder 418' turned away from the engine and a shoulder 418" on the side toward the engine is connected by nut 460 with end wall 414 and by a plate 461 with end wall 407, thereby connecting the two end walls rigidly with each other. End wall 407 is fixed by extension 424 of bolt 421 and a nut 425 to engine housing 426. A rubber elastic partition 403 is adheringly joined at its outer periphery with conical jacket 404, and is provided with a neck 410 on the side turned relatively away from the engine, which neck ends in a collar 411 reenforced by an angular metal insert 412. A main chamber 419 is constituted by peripheral wall 401 and end wall 407, and divided off by partition 403 from an auxiliary chamber 420 which is formed by peripheral wall 408 and end wall 414. Chambers 419 and 420 are interconnected via an annular gap 431 between collar 411 and bolt 421, which serves as a choke opening.

The engine mount is shown in an inoperative, operation-ready position which at the same time is a dynamic mid-setting of the mount. End wall 407 has four openings or perforations 447, or consists, like a wheel, of a rim 440 and four spokes 441. Each perforation 447 is covered by a diaphragm 442 of rubber elastic material which is adheringly joined to edge 444 of the opening of perforation 447. Spokes 441 are covered on both sides by rubber elastic material. On the left side of FIG. 4, a spoke 441 is shown in section, while the right side shows a section through a diaphragm 442. A wall face 462 of plate 461 toward end wall 407 constitutes an impact surface that limits an outwardly directed stroke of diaphragm 442 to, for example, a stroke of 1 mm, whereby the appurtenant stroke of wall 407 (which causes a corresponding volume change in main chamber 419) with reference to support element 427 is less, being for example 0.2 mm. End wall 414 has a plurality of openings or perforations 448 which, as shown on the left side of FIG. 4, are covered by a foamed material diaphragm 445 disposed on the inside of end wall 414. The right side of FIG. 4 shows a foamed material diaphragm 446 covering end wall 414, the side of the diaphragm turned toward auxiliary chamber 420 being reinforced by a foil 449.

Peripheral wall 401 on the engine side is made stronger than peripheral wall 408 on the side away from the engine, and essentially determines the elastic bearing strength of the engine mount or bearing. Peripheral wall 408 is capable of creating a volume balance, because of a somewhat diaphragm-like construction of the zone that forms a generally flat annular flange 408", if with a specific axial displacement of walls 407 and 414 the changes in volume evoked in main chamber 419 and auxiliary chamber 420 differ from one another. In this way it will be prevented that there may be negative pressure with noise-causing cavitation in chamber 419 or 420.

Thus having described our invention in the manner required by the statutes, including preferred embodiments thereof, we claim:

1. An elastic rubber engine mount with hydraulic damping, especially for engine suspensions in motor vehicles, comprising a first metallic end wall for connection to an engine casing, a second metallic end wall spaced axially from said first wall, a metallic supporting element for connection to an engine supporting frame, a first elastic rubber-like peripheral wall adheringly connected with said first end wall and with said supporting element, an elastic rubber-like partition connected with said supporting element so as to define with said first end wall and said first peripheral wall a liquid-filled main chamber of variable volume on one side of said partition, a second elastic rubber-like peripheral wall adheringly connected with said second end wall and with said supporting element so as to define an auxiliary liquid-filled chamber of variable volume on the other side of said partition, means forming a choke opening in said partition as a flow connection between said main and auxiliary chambers, and means rigidly connecting said first and second end walls together for joint movement relative to said supporting element, at least one of said metallic end walls being formed with at least one end wall opening covered by a resilient wall part which can flex resiliently to compensate for changes in the volume of said chamber, and thus pose a decreasing resistance to a change of liquid pressure in its appurtenant chamber, said end wall opening having a peripheral edge, the flexible wall part being so arranged that its outward flexure in response to pressure increases in said chamber is limited by engagement between the peripheral edge of said end wall opening and said flexible wall part.

2. An engine mount as claimed in claim 1 wherein said one wall has a plurality of said end wall openings covered by resilient wall parts.

3. An engine mount as claimed in claim 2 wherein said one wall has on its inner face toward its chamber a diaphragm covering all said end wall openings.

4. An engine mount as claimed in claim 3 wherein said diaphragm is a foamed material.

5. An engine mount as claimed in claim 4 wherein said diaphragm of foamed material is covered and reenforced by a foil sheet on the side exposed to liquid in the chamber.

6. An engine mount as claimed in claim 1 wherein said resilient wall part is an elastic diaphragm.

7. An engine mount as claimed in claim 1 wherein the movement of the resilient wall part is limited by a member connected with said one end wall so as to abut said resilient wall part after a predetermined movement.

8. An engine mount as claimed in claim 1 wherein said first elastic peripheral wall is elastically stronger than said second elastic peripheral wall such that the elastic bearing strength of the mount is substantially determined by said first elastic peripheral wall.

9. An engine mount as claimed in claim 1 wherein said engagement comprises a connection between said flexible wall part and the peripheral edge of said end wall opening.

10. An engine mount as claimed in claim 1 wherein said engagement comprises abutting engagement between the inner peripheral edge of said end wall opening toward said chamber and the outer surface of the flexible wall part away from said chamber, such that the pressure of the abutting engagement increases with fluid pressure increases in said chamber.

* * * * *